(12) United States Patent
Christiansen et al.

(10) Patent No.: US 6,402,605 B1
(45) Date of Patent: Jun. 11, 2002

(54) DRILLING DEVICE FOR BRITTLE MATERIALS

(75) Inventors: Uwe Christiansen, Gelnhausen; Henning Bierstedt, Friedersdorf, both of (DE)

(73) Assignee: Hecaeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/749,290

(22) Filed: Dec. 27, 2000

(30) Foreign Application Priority Data

Dec. 29, 1999 (DE) ......................... 199 63 636

(51) Int. Cl.[7] .............................. B23B 31/11
(52) U.S. Cl. ................ 451/540; 451/541; 408/145
(58) Field of Search .................. 451/540, 541–547, 451/488, 449, 58; 408/145, 224

(56) References Cited

U.S. PATENT DOCUMENTS

| | | | |
|---|---|---|---|
| 5,643,069 A | | 7/1997 | Christiansen |
| 5,658,103 A | * | 8/1997 | Inokuchi et al. ............ 408/145 |
| 5,733,074 A | * | 3/1998 | Stock et al. ................ 408/17 |
| 5,807,038 A | * | 9/1998 | Skinner ...................... 408/204 |
| 5,971,670 A | * | 10/1999 | Pantzar et al. ............... 407/34 |
| 6,012,881 A | * | 1/2000 | Scheer ....................... 408/227 |
| 6,152,660 A | * | 11/2000 | Papajewski ................. 408/144 |

FOREIGN PATENT DOCUMENTS

| | | |
|---|---|---|
| DE | 1 913 317 | 4/1965 |
| DE | 83 05 470.7 | 8/1984 |
| DE | 94 08 297.9 | 9/1994 |

* cited by examiner

Primary Examiner—Joseph J. Hail, III
Assistant Examiner—Anthony Ojini
(74) Attorney, Agent, or Firm—Andrew L. Tiajoloff

(57) ABSTRACT

The invention concerns a drilling device (1) for brittle materials with a drill head (2) detachably fixed to a drilling rod (3) by means of a positive-lock connection for transmission of the drilling torque. For its exact relative positioning, the drill head (2) has a conical shape (10) which in the represented operating state engages centrally into a corresponding recess (11) of the drilling rod (3). As a protection against any axial loosening, a fixing device or arrest (15; 20) designed as a hollow nut is provided engaging into a thread (16) of the drill head (2) and into a thread (17) of the drilling rod (3), the threads (16, 17) having counter-current pitches. By rotating the arrest (15), the drill head (2) and the drilling rod (3) can thus be simply braced against each other or pulled away from each other, the connection enclosed by the arrest (15) having optimum protection from external influences at the same time. Accordingly, the drilling device (1) allows for drilling at high accuracy without excessive wear or complicated handling.

17 Claims, 3 Drawing Sheets

DRILLING DEVICE FOR BRITTLE MATERIALS

Figure 1:
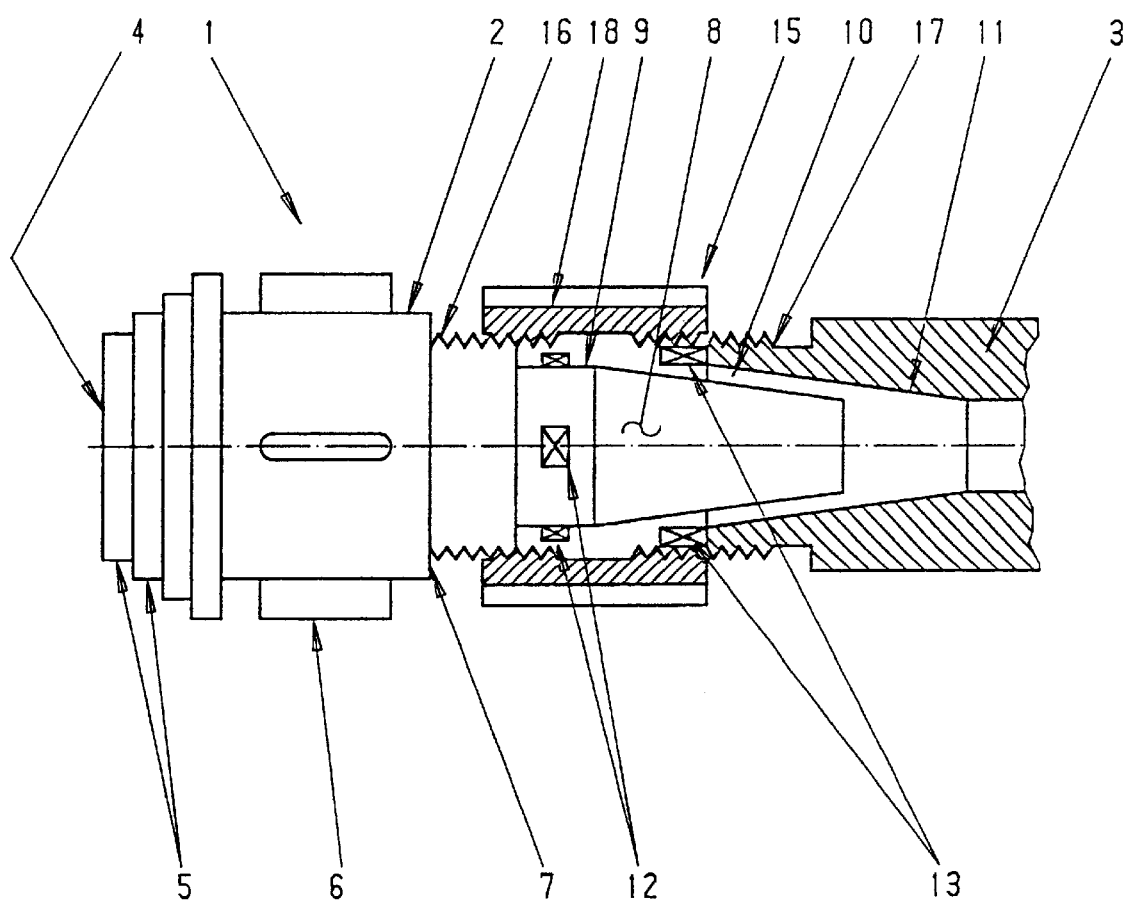

This invention concerns a drilling device for brittle materials with a drill head detachably fixed to a drilling rod by means of a positive-lock connection.

In practice, such drilling devices are used for drilling glass materials for example. The inherent basic conditions differ so fundamentally from those for processing metallic materials that the use of the same drilling devices is largely precluded. Firstly, an adaptation of the drill head is required to prevent undesirable damage to the brittle material, the drill head usually having several graduated drill bits differently dimensioned in their diameter. Also, the connection between drill head and drilling rod is to be adapted to the special circumstances in the processing of brittle materials. There are two basic objectives faced with this: on the one hand, accurate guiding of the drill head should be realized and thus a close tolerance processing of the material; on the other hand, simple handling of the drill head is to be realized as well.

It is already known from DE-GM 19 13 317 to connect the drill head with the drilling rod by means of a slot and feather design. However, such design of the connection can only insufficiently meet the requirements on the drilling device in terms of the required precision. In particular, it will be disadvantageous that—for the simple replacement of drill bits—a measure of tolerance must be provided for between their boring and the drilling shaft which will inevitably result in deviations of nominal values during the drilling process.

DE 44 34 025 A1, in contrast, shows an altered connection where the drilling rod is screwed on by means of a corresponding thread for fixation of the drill head. In this case, the drill head is aligned by two cylindrical bearing areas, as well as a front stop. Here too, a tolerance measure is to be provided for easy mounting which can result in imprecisions in the drilling process, especially in terms of the comparatively extravagant structure of the drill head and the increased requirements in the processing of brittle materials. Moreover, the screw connection requires considerable expenditure in maintenance and care to prevent premature wear, caused by grainy particles of material which can lead to deposits and thus to damages on the drill head surface.

For increasing the precision to be achieved, it might be conceivable to employ a connection well-proven in metal processing—a chuck for example. However, this will fail in the processing of materials which tend to produce chippings which cannot be comparatively easily removed; it may also fail because of damage to the connection due to deposits or penetrating particles, thus precluding any reliable continuous use.

Before this background, the invention is based on the task to provide for a connection between the drill head and the drilling rod which on the one hand allows for high accuracy in processing the material, and on the other hand for easy handling. Especially, any premature wear of the connection is to be precluded.

This task is met by a drilling device according to the characteristics of Patent claim 1. The sub-claims concern especially favorable embodiments of the invention.

According to the invention, a drilling device is provided in which the positive-lock connection between drill head and drilling rod is designed for a reliable transmission of the drilling torque, while an essentially conical shape is provided and insertable into a corresponding receptacle for centric positioning of the drill head on the drilling rod. Thus the drill head, independent of the transmission of the drilling torque, is positioned and centered with high accuracy by means of the conical shape, the drilling torque being transmitted by the positive-lock connection. Accordingly, no thread is required for fixing the drill head, and even comparatively large tolerances do not affect the accuracy of the subsequent drilling process, as the drill head is positioned exclusively by the conical shape. Thus, handling is greatly simplified so that the expenditure on changing the drill head as well as the downtimes of the drilling device in the manufacturing process can be significantly reduced. At the same time, the expenditure on care and maintenance is reduced as the design of the positive-lock connection minimizes the influences of material chippings also in permanent operation. The cleaning of the conical shape, if required, is simple as there are no moving components or undercuts.

In an especially favorable embodiment of the drilling device according to the invention, the positive-lock connection is formed by at least one projection connected with the drill head and by a recess of the drilling rod, the recess accepting the projection. Thus, such a projection, designed for example as a cam, engages in positive-lock into the recess of the drilling rod on fixing the drill head, thus reliably transmitting the drilling torque. Any tolerance measures between recess and drilling are not harmful here, as the contact areas between drilling head and drill rod automatically rest against each other on operation of the drill head. Accordingly, feeding devices designed for example as a chamfering device can be provided for further simplified execution of the connection.

In a simple embodiment of the connection, the positive-lock connection has a claw coupling. Such a connection, also available as a standard component, allows for simple installation and a reliable use of the drilling device in practice. For this purpose, the claw coupling has for example at least two immobile or even mobile claws arresting automatically in operating position, thus preventing any undesirable axial release of the drill head from the drilling rod, for example on drawing the drill head back from the drilled hole.

Another favorable embodiment of the invention serves this purpose especially well as the drilling device features an arrest as a protection against any undesirable relative axial mobility between the drill head and the drilling rod. Here, this arrest or fixing device primarily protects the projection and the recess from getting out of contact, in which case the reliable transmission of the drilling moment is no longer guaranteed. Thus, the arrest, designed for example as a catching or clamping device, serves to protect the connection between drill head and drilling rod to prevent any loosening of the connection. Also stopping bodies designed as a wedge, or a locking pin penetrating the connection are conceivable.

In another especially favorable embodiment of the invention, the arrest has a sleeve which engages into a thread of the drill head or into a thread of the drilling rod. Subsequent to the connection of the drill head and the drilling rod, the sleeve allows them to be non-positively braced against each other, precluding any incidental loosening. At the same time, the sleeve designed as a hollow nut encloses the connection, thus allowing for sealing or at least for improved protection against any penetrating particles. Here, the sleeve is arranged freely rotatable either at the drill head or at the drilling rod, with limited axial mobility in the direction of the respective remaining component. For fixing, the sleeve is slipped over the connection, engaging by rotation into the respective thread, the opposite end of the sleeve sitting against a stopper.

In another especially practical embodiment of the invention, the arrest simultaneously engages into a thread of the drill head and into a thread of the drilling rod, with the two threads having countercurrent pitches. By the arrest thus engaging into the countercurrent threads, the drill head can easily be braced against the drilling rod, a good sealing effect and thus an improved protection of the connection enclosed by the arrest being achieved as well. To disengage the connection, the arrest is simply rotated into the opposite direction, drill head and drilling rod being separated. In this way, the disengagement is comparatively effortless even if the connection has to be disengaged against the adhesive powers of deposited particles.

The arrest can have a cross section with a polygonal outside surface allowing for application of a commercially available tool for realization of the necessary rotary movement. In an especially recommendable embodiment of the invention, the arrest has on the outside at least one depression running over the entire axial distance. In this way, this depression at the same time allows for unimpeded flowing of the drilling fluid along the depression serving as a channel. Simultaneously, a tool engaging into the depression can be used to create the rotary movement. The depression can run either primarily parallel to the drilling axis, or it can be slant or arranged in a spiral, which also assists the flow of the drilling fluid. By a multitude or depressions, the advantageous effects are enhanced.

In another especially practical embodiment of the invention, the arrest is arranged recessed versus the outside radial dimensions of the drill head. In this way, the flow of the drilling liquid is only insignificantly affected, and contact of the arrest and a wall space of the drilled hole and a respective potential damage to the arrest or the wall space is avoided.

Furthermore, it is especially favorable when the arrest has a form element covering coaxially a depression arranged on the circumference of the drill head respectively the drilling rod so that a hollow space is formed which will prevent any axial displacement between drill head and the drilling rod by filling it with obstructing bodies, especially balls. For this purpose, the drill head or drilling rod require merely a depression designed as a groove, while the fixing device or arrest equipped for axial fixing is provided with a corresponding guiding strip for the obstructing bodies. The arrest created in this way also allows for retrofitting of already existing drilling devices.

In an especially simple embodiment of the invention, the arrest is designed as a union nut. This union nut can for example be arranged on the drill head freely rotatable and fixed in axial direction, so that after locking of the connection, the drill head can be axially fixed by simply screwing the union nut on the a thread of the drilling rod. In this way, the expenditure for manufacture and for handling when exchanging drill heads can be further reduced.

In another especially favorable embodiment of the invention, the arrest is designed in such a way that the drill head has a first form element which in operating state together with a second form element of the drilling rod limits a hollow space which, when filled with obstructing bodies, especially balls, will prevent any axial displacement between drill head and the drilling rod. Thus, a simple axial fixing or arrest of the drill head to the drilling rod is achieved which can be handled effortlessly, while the fixing device is designed as an integral part of the drill head and the drilling rod so that no additional component is required. Here, the hollow space is filled with obstructing bodies through a lockable opening, so that any axial displacement of the drill head versus the drilling rod is blocked by means of the two form elements essentially covering each other, while a relative rotation of the drill head versus the drilling rod is not be precluded. Accordingly, the drilling torque is transmitted exclusively by a positive-lock connection. Embodiments are also conceivable in which by introduction of the obstructing body, any axial displacement is prevented and simultaneously the transmission of drilling torque is made possible.

Figure 2:
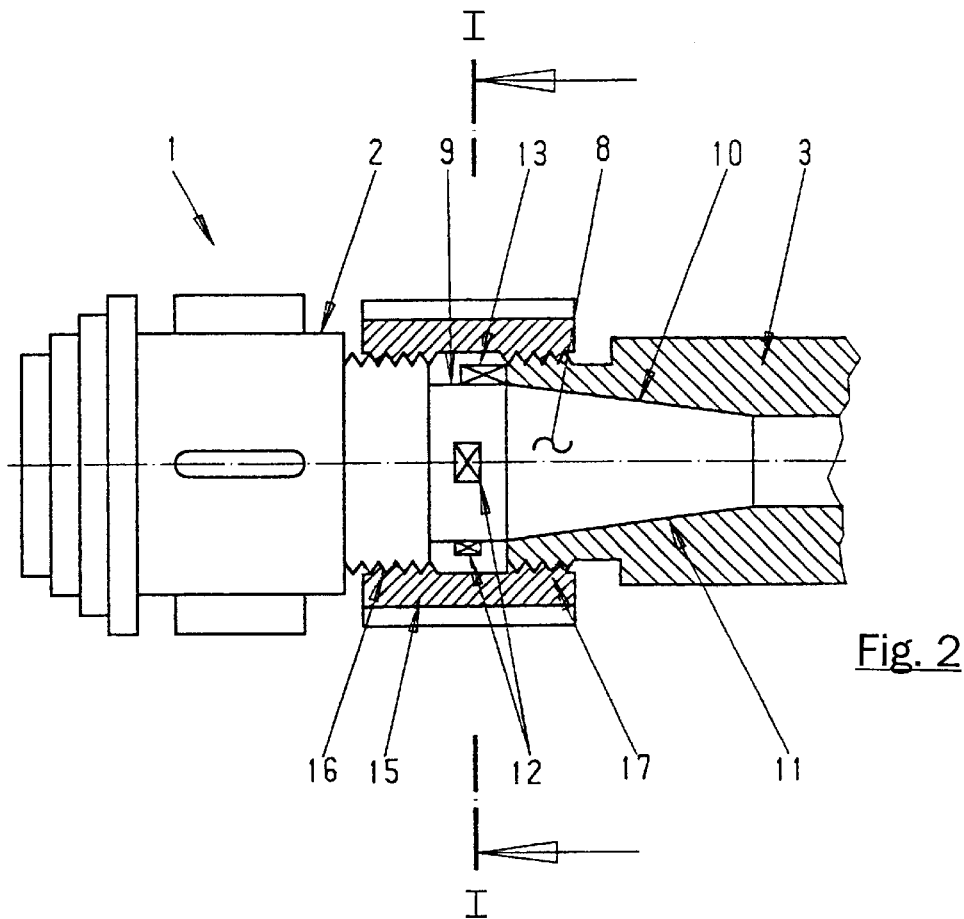
Figure 3:
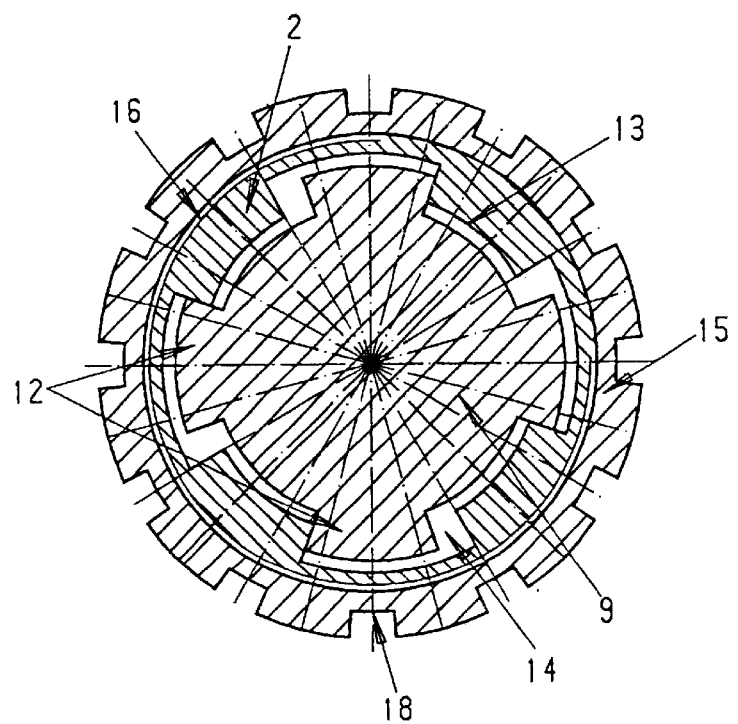
Figure 4:
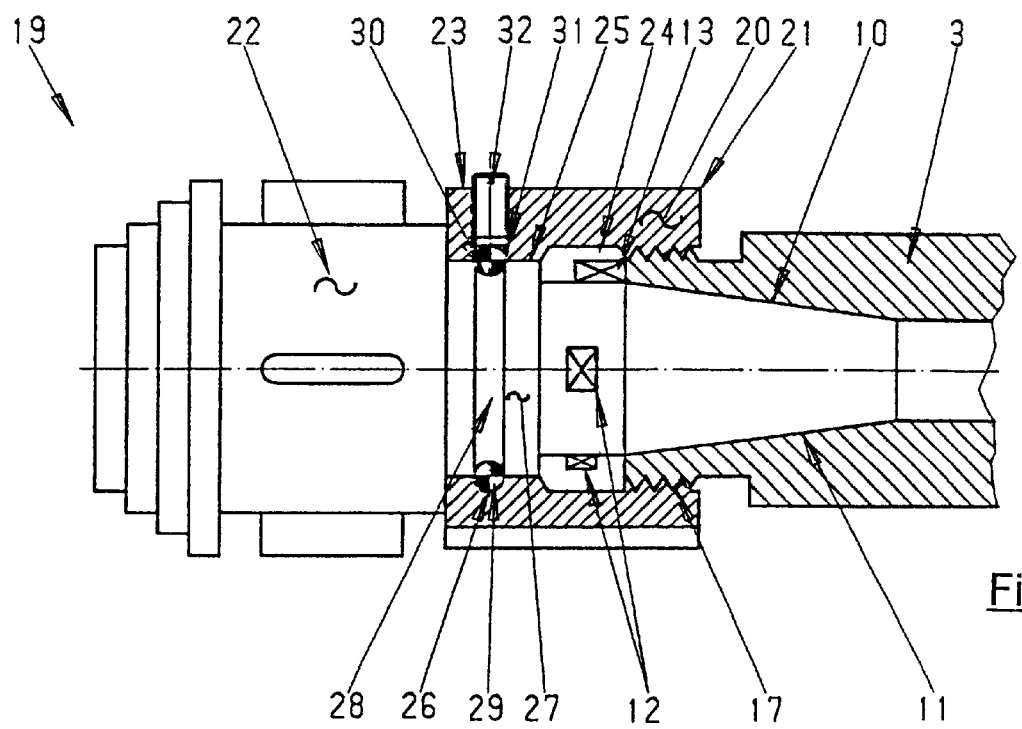

The invention provides for numerous embodiments. For explanation of its basic principle, two such embodiments are represented in the Figure and are described in the following. It is shown in FIG. 1 a lateral sectional view of a drilling device whose drill head is not yet fixed on a drilling rod;

FIG. 2 a lateral sectional view of the drilling device shown in FIG. 1 in operative condition;

FIG. 3 a section along line I–I of the presentation in FIG. 2;

FIG. 4 in a sectional side view, a drilling device with a connection between drill head and drilling rod, the connection being changed versus FIGS. 1 and 2.

FIG. 1 shows a lateral section of the drilling device 1 with a drill head 2 and a drilling rod 3 not yet connected to each other. At its front end 4, the drill head has several drill bits 5, each with different diameters for gradual extension of the drilled hole, as well as several guiding strips 6, which, in cooperation with a drilling fluid (not represented) provides for support at an inside wall of the drilled hole (likewise not represented) by forming a pressure pad. Furthermore, drill head 2 at its end 7 facing the drilling rod 3 is equipped with an extension 8 having a cylindrical section 9 and a conical shape 10. This conical shape 10 can be inserted into a corresponding recess 11 of the drill rod 3, thus enabling the drill head 2 to be centered in drilling rod 3. For transmission of the drilling torque, the cylindrical section 9 of drill head 2 has on the outside several projections 12 designed as cams. These projections 12 dip into the corresponding recesses 13 of drilling rod 3, thus defining the transmission of drilling torque. To prevent any axial displacement of drill head 2 versus drilling rod 3, the drilling device 1 has an arrest 15 designed as a hollow nut, engaging simultaneously into a first thread 16 of drill head 2 and into a second thread 17 of drilling rod 3. Both threads 16, 17 have countercurrent pitches, so that the drilling rod 3 and the drill head 2 can be braced against each other by rotating the arrest 15. For exchanging the drill head 2, drill head 2 and drilling rod 3 can likewise be separated from other by rotating the arrest 15 into the other direction, the conical shape 10 being pulled out of the recess 11. For this purpose, the arrest 15 has on its outside several depressions 18 designed as grooves, allowing for simple application of a tool for screwing or unscrewing and as well for an increase of the cross section for the flow of the drilling fluid.

FIG. 2 shows a lateral sectional view of the operating state of the drilling device 1, in which the drilling rod 3 and the drill head 2 are connected. Here, the projections 12 arranged at the cylindrical section 9 of extension 8 dip into the recesses 13 of drilling rod 3, thus forming the positive-lock connection for transmission of the drilling torque. The centered orientation between the drill head 2 and the drilling rod 3 is defined by the conical shape 10 of drill head 2 resting free from play against receptacle 11 of drilling rod 3. To prevent any undesirable axial displacement of the drill head 2, the arrest 15 designed as a hollow nut in the represented operating state is screwed onto the countercurrent pitches 16, 17 of drill head 2 and drilling rod 3, so that they can braced against each other. Simultaneously, the positive-lock connection is thus protected from any influences by material chippings or drilling fluid, so that there is relatively little wear of the device.

FIG. 3 shows a section along line I–I of the presentation in FIG. 2, illustrating the positive-lock connection between drill head 2 and the (not represented) drilling rod 3. Here, extension 8 of drill head 2 is visible with for example four projections 12 evenly arranged on the circumference of the cylindrical section 9. These projections 12 dip into the correspondingly designed recesses 13 of the drilling rod 3, thus allowing for a reliable transmission of the drilling torque at their contact spaces. To prevent any jamming at engagement, a mounting gap 14 is provided. Furthermore, the arrest 15 with the thread 16 of the drill head 2 is represented. The outer space of the arrest 15 is equipped with a multitude of depressions 18 designed as grooves.

FIG. 4 shows in a sectional side view of a drilling device 19, the connection being changed versus FIGS. 1 and 2 primarily in respect of a changed arrest 20. Here, the arrest 20 at its end section 21 facing the drilling rod 3 engages into the thread 17 of the drilling rod 3. At its end section 23 facing the drill head 22, the arrest 20 designed as a hollow body 24 has a form element 26 arranged on its inside wall 25. In the represented operating state, this form element 26 is covered congruently with a depression 28 arranged on the circumference of a cylindrical section 27 of the drill head 22. In an annular hollow space 29 with a circular cross section, thus limited by the depression 28 and the form element 26, obstructing bodies 30 designed as balls are filled into an opening 31 of the arrest 20 and then locked by means of a locking screw 32. Thus, any relative axial displacement between the drill head 22 and the drilling rod 3 is precluded. For transmission of the drilling torque, the drill head 22 has several projections 12 dipping into the recess 13 of the drilling rod 13, while the centric positioning takes place free of play between the drill head 22 and the drilling rod 3 by means of the conical shape 10 of the drill head 22 against the receptacle 11 of the drilling rod 3.

By means of the separation of the functional units for transmission of the drilling torque via the positive-lock connection of the projections 12 to the recesses 13, as well as the exact centric positioning through the conical shape 10, and for protection from axial loosening by the arrest resp. fixing device 20, a coupling between the drill head 2, 22 and the drilling rod 3, 23 is achieved which best meets the special requirements with drilling of brittle material. In this way, it is possible for the first time to drill holes at high accuracy without exposing the drilling device 1, 19 to increased wear, or without incurring excess expenditure for manufacture and handling.

List of reference numbers:

1 drilling device
2 drill head
3 drilling rod
4 front end
5 drill bit
6 guiding strip
7 end
8 extension
9 cylindrical section
10 conical shape
11 receptacle
12 projection
13 recess
14 mounting gap
15 arrest
16 thread of the drill head
17 thread of the drilling rod
18 depression
19 drilling device
20 arrest
21 end section
22 drill head
23 end section
24 hollow body
25 inside wall
26 form element
27 cylindrical section
28 depression
29 hollow space
30 obstructing body
31 opening
32 locking screw

What is claimed is:

1. A drilling device for brittle materials, said drilling device comprising:
   a drilling rod to which a drilling torque is applied;
   a drill head detachably secured to the drilling rod with a positive-lock connection;
   the positive-lock connection being designed for a reliable transmission of the drilling torque and comprising
   an essentially conical shaped portion and
   a corresponding receptacle having a corresponding space therein configured to correspondingly receive therein the conical shaped portion so that said receptacle engages the conical shaped portion so as to provide centric positioning of the drill head on the drilling rod.

2. The drilling device of claim 1 wherein the positive-lock connection is provided by at least one projection connected with the drill head and walls in the drilling rod defining a recess therein accepting said projection.

3. The drilling device of claim 1 wherein the positive-lock connection has a claw coupling.

4. The drilling device of claim 1 wherein the drilling device further comprises an arrest securing the drill head and the drilling rod against undesirable relative axial movement therebetween.

5. The drilling device of claim 4 wherein at least one of the drill head and the drilling rod has a thread thereon, and the arrest includes a sleeve which threadingly engages said thread.

6. The drilling device of claim 4 wherein the arrest has a sleeve which threadingly engages a thread of the drill head and a thread of the drilling rod, said threads having countercurrent pitches.

7. The drilling device of claim 4 wherein the arrest has an outside surface having therein at least one depression extending substantially over an axial length thereof.

8. The drilling device of claim 4 wherein the arrest and the drill head each have a maximal radially outward dimension, and the radially outward dimension of the arrest is less than the radially outward dimension of the drill head.

9. The drilling device of claim 4 and
   the drill head having a circumferential depression therein and the arrest having a form element coaxially covering the depression so that a hollow space is defined therebetween, and
   obstructing bodies in the hollow space preventing axial displacement between the drill head and the drilling rod.

10. The drilling device of claim 9 wherein the obstructing bodies are generally spherical balls.

11. The drilling device of claim 4 wherein the arrest is a screw cap.

12. The drilling device of claim 1 wherein the drilling device further comprises an arrest having a form element which together with a shaped portion of the drilling rod defines a hollow space therebetween holding therein obstructing bodies engageable with the shaped portion and the form element to prevent axial displacement of the drill head relative to the drilling rod.

13. The drilling device of claim 12 wherein the obstructing bodies are generally spherical balls.

14. A drilling device comprising:

a drilling rod to which a drilling torque is applied;

a drill head detachably secured to the drilling rod so as to receive the drilling torque therefrom and drill a workpiece of brittle material;

the drill head having a generally conical portion extending axially therefrom; the drilling rod having therein walls defining a flaring recess, the walls having at least partial concave conical surfaces that correspond to the conical shaped portion figured to contact with at least a portion of the conical shaped portion and axially center the drill head on the drilling rod;

a securement structure securing the drill head and the drilling rod against relative axial movement, said securement structure including a sleeve threadingly engaging a thread on the drill head and a thread on the drilling rod, said threads having countercurrent pitches;

the securement structure and the drill head each having a respective maximum radial dimension, the securement structure being radially recessed relative to the drill head so that the maximum radial dimension of the securement structure is less than the maximum radial dimension of the drill head.

15. The drilling device of claim 14 wherein the securement structure has an outside surface having therein at least one depression extending substantially over an axial length thereof so as to provide for flow of drilling fluid.

16. The drilling device of claim 14 wherein the drill head has radially outwardly extending projections, and the drilling rod has abutment portions receiving the projections therebetween, said drill head receiving the drilling torque through the abutment thereof.

17. The drilling device of claim 16 wherein the sleeve of the securement structure surrounds and isolates said projections and abutment surfaces from particles of brittle material created during drilling.

\* \* \* \* \*